R. B. WOLF.
APPARATUS FOR BLOWING ACID GAS.
APPLICATION FILED JULY 13, 1911.
1,097,784.
Patented May 26, 1914.
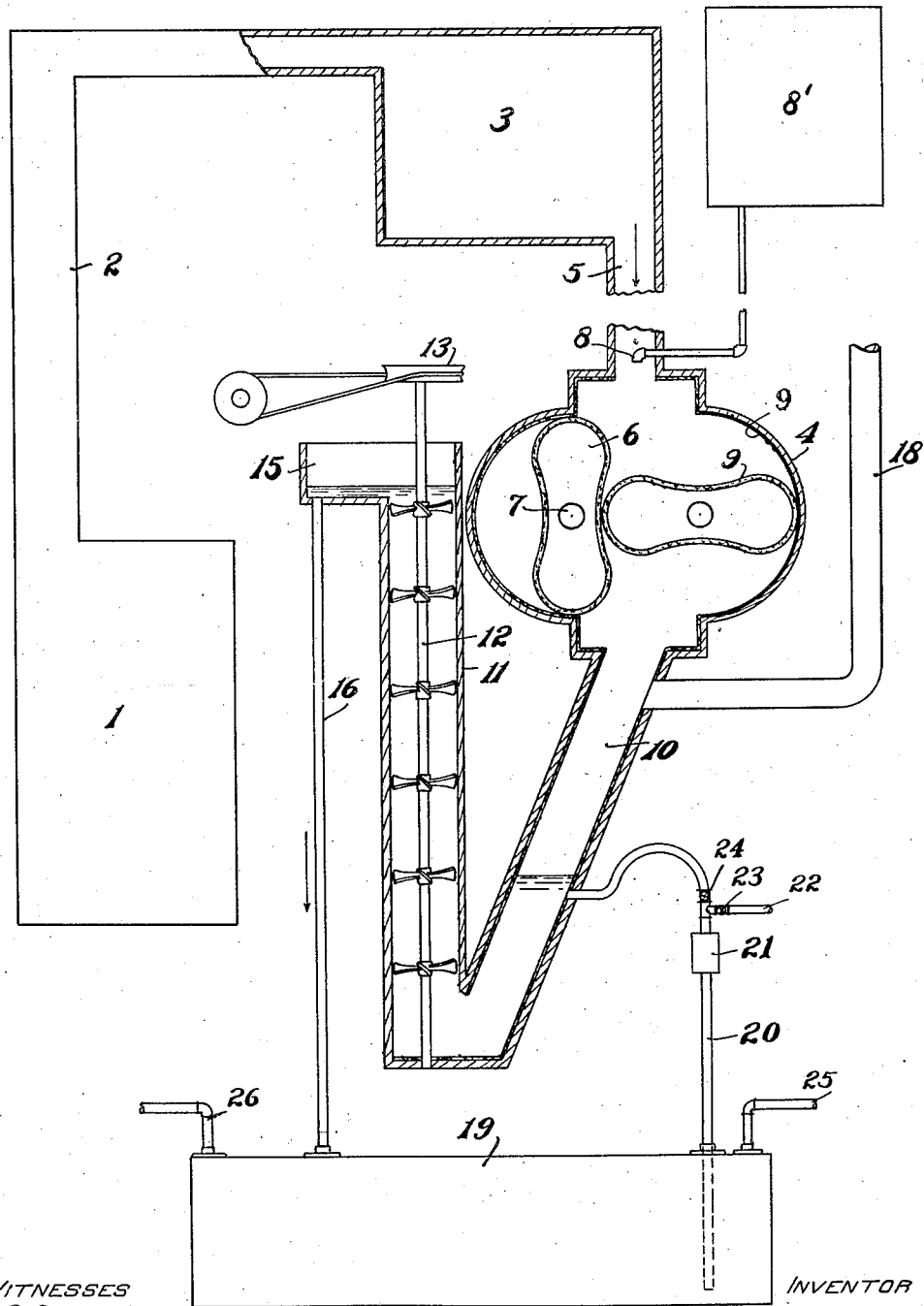

UNITED STATES PATENT OFFICE.

ROBERT B. WOLF, OF BERLIN, NEW HAMPSHIRE, ASSIGNOR TO BURGESS SULPHITE FIBRE CO., OF PORTLAND, MAINE, A CORPORATION OF MAINE.

APPARATUS FOR BLOWING ACID GAS.

1,097,784.  Specification of Letters Patent.  Patented May 26, 1914.

Application filed July 13, 1911. Serial No. 638,379.

*To all whom it may concern:*

Be it known that I, ROBERT B. WOLF, a citizen of the United States, residing at Berlin, New Hampshire, have invented certain new and useful Improvements in Apparatus for Blowing Acid Gas, of which the following is a specification.

This invention relates to blowers, and particularly to a gas blower for an acid gas, such as that employed in the acid system of a sulfite plant. In order to make clear the demands of actual practice, and to illustrate the uses of my blower in such practice, I shall particularly discuss it in connection with an acid system.

In the production of the acid to be used in a sulfite process it has been very much desired to handle the sulfur dioxid for the acid under more than atmospheric pressure. In my previous application, Serial Number 528,444, I have disclosed and discussed at length a complete apparatus for an acid system having this feature among others. In another previous application, Serial Number 605,241, I have discussed the method of handling an acid gas which is involved in the forcing means shown in these two prior applications and which together with certain other apparatus constitutes the subject matter of my present application. In this system it is found of great advantage to handle the gas by a blower interposed between the burners, or, more specifically, between the coolers and the acid chambers. The action of the acid, however, upon any ordinary material of which a blower could be practically constructed is so great as to render the use of a blower of ordinary construction impossible. To this end, therefore, I have devised my blower, which I am able to use in the desired location in such a system, or any other systems, without undue action on it by the gas which it handles. In the present case I shall, therefore, treat of the blower and its fittings, the same being more fully described in the specification which follows.

In the drawings, as illustrative of my invention, I have shown a form of construction which I have found advantageous in actual use.

Throughout specification and drawings like reference numerals are employed to indicate corresponding parts and in the drawings I have shown, partly in section and partly in elevation, a blower and its fittings, with so much of the gas end of the system as is necessary for an understanding of the action of the blower.

A casing 4 is provided within which impellers 6 are rotatably mounted on shafts 7. Sulfur dioxid is drawn into this casing from a cooler 3 to which the gas comes, through a pipe 2, from the burners 1. The pipe 11 is connected by a bent foot 10 at the lower side of the blower and, at about the point of connection, the pipe 18 is led off to the acid chambers.

Within the upright pipe 11 is rotatably mounted a shaft 12, provided with suitable stirrers, and at its top the pipe is provided with a spillway 15, from which the liquid may pass off through a pipe 16.

The blower casing 4 is provided with a spray nozzle 8 fed from a tank 8' which, in the system cited, would contain fresh lime water. The blower is, therefore, sprayed internally with a fine spray of lime water which maintains within the blower casing and on the impellers 6 a coating 9 of calcium monosulfite which, upon microscopic examination is shown to be in fine crystalline form, the crystals being in the tetragonal system with one long and two short axes. The blower is, therefore, lined and coated with a layer of a protective nature which prevents any action of the acid gas on it.

The pipe 16 leads to a tank 19 which is fed with milk of lime. This tank also contains calcium monosulfite $CaSO_3$. The tank 19 may properly be called a basic liquid or basic liquor tank rather than the lime tank with which it corresponds in a general way, in prior system. From the basic liquid tank 19, a pipe 20 having a pump 21 in its circuit, is carried back to a point just below the normal level of the liquid in the tube 10. This provides a circulation through the tube 11 which carries along the calcium monosulfite which tends to gather as a granular mud in the points between the tubes 10 and 11. The forcing up of this deposit in this manner makes it possible to carry along the calcium monosulfite with the aid of the stirrers 12 through the tube 11 from which point it can run back into said tank 19.

In operation, the gas is drawn from the burners 1, by the blower, through the pipe 2 and the coolers 3, into the blower itself. Here it is met by the fine spray of lime water, thus maintaining the coating or lining of the blower and its impellers. The excess of liquid from the blower 4 drops into the bent foot 10 and, rising through the upright pipe 11 in which it is agitated, is spilled off through the pipe 16 to any suitable tank in which it may be conserved for subsequent use. The gas delivered from the blower passes through the pipe 18 to the acid chambers. It will thus be seen that I have devised a lined blower in which the lining is self sustaining and effective to protect the blower from the action of the gas.

Various modifications may, of course be made in the construction of the blower, in its location and in the materials employed in its lining, all without departing from the spirit of my invention if within the limits of the appended claims.

What I, therefore, claim and desire to secure by Letters Patent is:—

1. In an apparatus for handling an acid gas, a blower for said gas, a source of supply for a neutralizing agent, means for discharging said neutralizing agent into said blower so as to deposit an inactive coating on the parts of the blower.

2. In an apparatus for making sulfite liquor means for producing gas containing $SO_2$, a blower for said gas comprising a casing having an intake and a discharge, impellers therein, a source of supply for a neutralizing agent, means for discharging said neutralizing agent into said blower casing so as to deposit an inactive coating on the parts of the blower.

3. In an apparatus for making sulfite liquor means for producing gas containing $SO_2$, a blower for said gas comprising a casing having an intake and a discharge, impellers therein a tank for a neutralizing agent, a pipe from said tank discharging into said blower so as to deposit an inactive coating on the parts of the blower.

4. In an apparatus for making sulfite liquor means for producing gas containing $SO_2$, a blower provided with means for initially treating said gas with milk of lime, means for permitting the separation of the liquid and the gas, including a trap having a bent foot, means for conducting said liquid from said trap, a tank for said liquid which is conducted, and means for pumping said liquid back into said trap to secure a circulation of the liquor therethrough.

5. In an apparatus for making sulfite liquor means for producing gas containing $SO_2$, a blower for said gas comprising a casing having an intake and a discharge, impellers therein, a source of supply for a liquid neutralizing agent, means for discharging said neutralizing agent, into said blower for the purpose of depositing an inactive coating on the parts of the blower, means for permitting the separation of said liquid neutralizing agent and said gas including a trap having a bent foot, an agitator therein means for conducting said liquid from said trap, a tank for said liquid which is conducted and means for pumping said liquid back into said trap to secure a circulation of the liquid therethrough.

6. In an apparatus for making sulfite liquor means for producing gas containing $SO_2$, a blower for said gas, a source of supply for a liquid neutralizing agent, means for discharging said neutralizing agent into said blower for the purpose of depositing an inactive coating on the parts of the blower, means for permitting the separation of said liquid neutralizing agent and said gas including a trap having a bent foot, means for conducting said liquid from said trap, a tank for said liquid which is conducted and means for pumping said liquid back into said trap to secure a circulation of the liquid therethrough.

In testimony whereof I affix my signature in presence of two witnesses.

ROBERT B. WOLF.

Witnesses:
L. D. GOODWIN,
V. LOWDEN.